(12) United States Patent
Venkataraman et al.

(10) Patent No.: US 10,380,127 B2
(45) Date of Patent: Aug. 13, 2019

(54) CANDIDATE SEARCH RESULT GENERATION

(71) Applicant: Microsoft Technology Licensing, LLC, Redmond, WA (US)

(72) Inventors: Ganesh Venkataraman, San Jose, CA (US); Dhruv Arya, Sunnyvale, CA (US); Aman Grover, Sunnyvale, CA (US); Liang Zhang, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 15/430,839

(22) Filed: Feb. 13, 2017

(65) Prior Publication Data

US 2018/0232375 A1 Aug. 16, 2018

(51) Int. Cl.
| | |
|---|---|
| *G06F 17/30* | (2006.01) |
| *G06F 16/2457* | (2019.01) |
| *G06N 20/00* | (2019.01) |
| *G06F 16/93* | (2019.01) |
| *G06F 16/248* | (2019.01) |
| *G06F 16/951* | (2019.01) |
| *G06N 5/00* | (2006.01) |

(52) U.S. Cl.
CPC ...... *G06F 16/24578* (2019.01); *G06F 16/248* (2019.01); *G06F 16/93* (2019.01); *G06F 16/951* (2019.01); *G06N 5/003* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,636,849 B1 | 10/2003 | Tang et al. | |
| 7,716,225 B1* | 5/2010 | Dean .................... | G06F 17/2235 707/748 |
| 9,009,146 B1 | 4/2015 | Lopatenko et al. | |
| 9,305,099 B1* | 4/2016 | Dean .................... | G06F 17/2235 |
| 2010/0217768 A1* | 8/2010 | Yu ......................... | G06F 17/3064 707/750 |
| 2011/0208735 A1 | 8/2011 | Gao et al. | |
| 2011/0252012 A1 | 10/2011 | Kanduri et al. | |
| 2012/0078825 A1 | 3/2012 | Kulkarni et al. | |

(Continued)

OTHER PUBLICATIONS

Borisyuk, et al., "CaSMoS: A Framework for Learning Candidate Selection Models over Structured Queries and Documents", In the Proceedings of the 22nd ACM SIGKDD International Conference on Knowledge Discovery and Data Mining, Aug. 13, 2016, pp. 441-450.

(Continued)

*Primary Examiner* — Debbie M Le
(74) *Attorney, Agent, or Firm* — Schwegman Lundberg & Woessner, P.A.

(57) ABSTRACT

A trained search system can be configured to retrieve a candidate subset of results, where the trained search system uses data extracted from a machine learning scheme. The machine learning scheme can be trained to identify results that are ranked by a computationally expensive algorithm, such as a ranking algorithm. When a query is received, the trained search system can be used to retrieve results instead of applying the computationally expensive ranking algorithm.

20 Claims, 14 Drawing Sheets

(56) References Cited

U.S. PATENT DOCUMENTS

| | | | |
|---|---|---|---|
| 2013/0086024 A1* | 4/2013 | Liu | G06F 16/951 |
| | | | 707/706 |
| 2015/0186938 A1 | 7/2015 | Zhang et al. | |
| 2016/0203221 A1* | 7/2016 | Rao | G06F 17/30864 |
| | | | 707/707 |
| 2017/0147691 A1* | 5/2017 | Li | G06F 17/30864 |

OTHER PUBLICATIONS

Covington, et al., "Deep Neural Networks for YouTube Recommendations", In Proceedings of the 10th ACM Conference on Recommender Systems, Sep. 15, 2016, 8 Pages.

"International Application Serial No. PCT/US2017/054418, International Search Report dated Dec. 15, 2017", 2 pgs.

"International Application Serial No. PCT/US2017/054418, Written Opinion dated Dec. 15, 2017", 6 pgs.

\* cited by examiner

CANDIDATE SEARCH RESULT GENERATION

TECHNICAL FIELD

Embodiments disclosed herein relate generally to data processing and, more particularly, but not by way of limitation, to generating a candidate subset of search results using a search engine.

BACKGROUND

Recently, the amount of data to be searched via search engines has grown dramatically. Some search engines use computationally expensive ranking schemes to rank the results according to how well they match a given query. However, the computationally expensive schemes identify results too slowly, which results in a negative user search experience.

BRIEF DESCRIPTION OF THE DRAWINGS

Various ones of the appended drawings merely illustrate example embodiments that are disclosed herein and should not be considered as limiting its scope.

DETAILED DESCRIPTION

The description that follows includes systems, methods, techniques, instruction sequences, and computing machine program products that embody illustrative embodiments that are disclosed herein. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a computationally expensive scheme, such as a ranking algorithm, is used to generate a ranked dataset by ranking a plurality of documents for a given query. The query can be submitted by a user that has a user profile page on a network platform (e.g., website). The user profile page contains various fields that describe attributes about the user, such as level of education, skillset, and past experience. A machine learning scheme, such as a decision tree, can be trained to generate the ranked dataset using comparisons between user information (e.g., query fields, user profile fields) and document fields (e.g., job title, experience required).

Documents in the plurality of documents that have received positive user interactions can be boosted so that the decision tree is more likely to include them in the top portion of the ranked dataset. A search engine scheme can then use information from the decision tree to weight the search engine scheme's own values (e.g., weightings). The trained search engine scheme can then be used to more quickly identify the top portion of the ranked documents. For example, when a user query is received, the trained search engine scheme uses the query data and the user data to quickly retrieve result results. In this way, matching results can be identified without applying the computationally expensive scheme against the plurality of documents.

Figure 1:
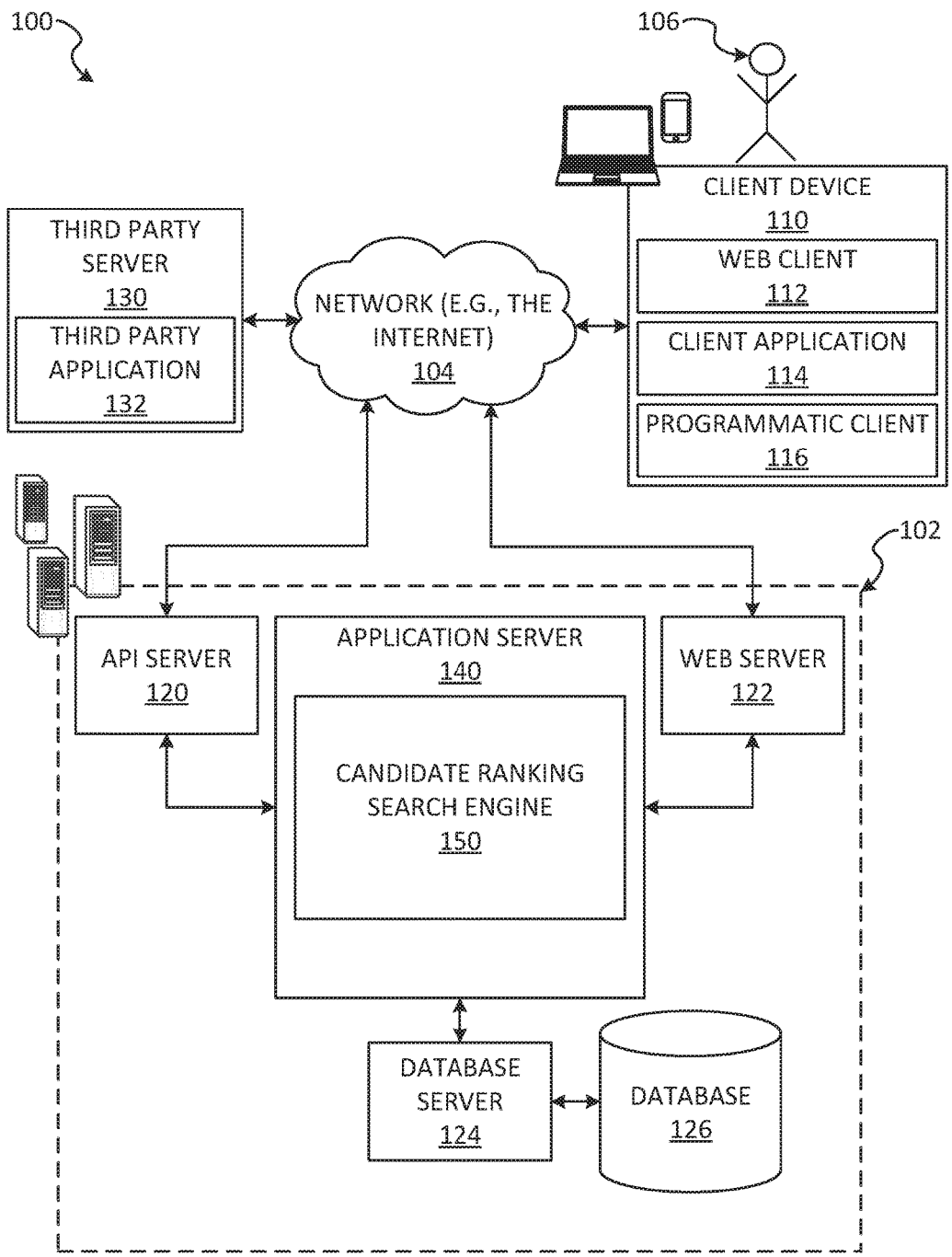
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), client applications 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a. Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched. Telephone Network (PSTN), a cellular telephone network, a wireless network, a Wireless Fidelity (WI-FI®) network, a. Worldwide Interoperability for Microwave Access (WiMax) network, another type of network, or any suitable combination thereof.

The web client 112 accesses the various systems of the networked system 102 via the web interface supported by a web server 122. Similarly, the programmatic client 116 and client application 114 access the various services and functions provided by the networked system 102 via the programmatic interface provided by an Application Program Interface (API) server 120.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides inputs a search query into the client device 110 and the search query is communicated to the networked system 102 via the network 104. In this instance, the networked system 102, in response to receiving the input from the user 106, communicates search results to the client device 110 via the network 104 to be presented to the user 106, as discussed in greater detail below. In this way, the user 106 can interact with the networked system 102 using the client device 110.

The API server 120 and the web server 122 are coupled to, and provide programmatic and web interfaces respectively to, one or more application server 140. The application server 140 can host a candidate ranking search engine 150, which can comprise one or more engines or applications and each of which can be embodied as hardware, software, firmware, or any combination thereof. The application server 140 is, in turn, shown to be coupled to a database server 124 that facilitates access to one or more information storage repositories, such as database 126. In an example embodiment, the database 126 comprises one or more storage devices that store information to be accessed by candidate ranking search engine 150 or client device 110. Additionally, a third-party application 132, executing on third-party server 130, is shown as having programmatic access to the networked system 102 via the programmatic interface provided by the API server 120. For example, the third-party application 132, utilizing information retrieved from the networked system 102, supports one or more features or functions on a website hosted by the third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the application server 140 (e.g., the candidate ranking search engine 150) can also be implemented as standalone software programs, which do not necessarily have networking capabilities.

Figure 2:
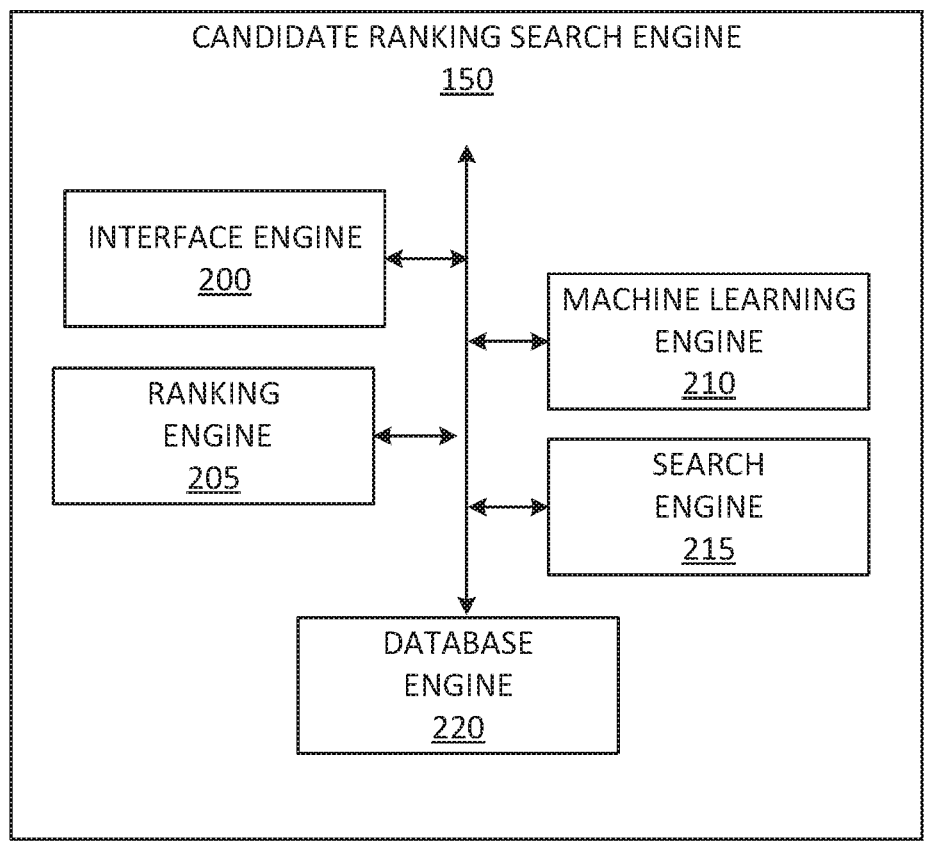
FIG. 2 illustrates a block diagram showing components provided within the candidate ranking search engine, according to some embodiments.

FIG. 2 illustrates a block diagram showing components provided within the candidate ranking search engine 150, according to some embodiments. The components themselves are communicatively coupled (e.g., via appropriate interfaces) to each other and to various data sources, so as to allow information to be passed between the applications or so as to allow the applications to share and access common data. Furthermore, the components access the database 126 via the database server 124.

As illustrated, candidate ranking search engine 150 comprises an interface engine 200, a ranking engine 205, a machine learning engine 210, a search engine 215, and a database engine 220. The interface engine 200 manages interfacing with other network components, e.g., receiving a query from a user and returning search results to the user. The ranking engine 205 is configured to rank a plurality of documents according to how well each of the documents matches a query (e.g., keywords) or the user's profile data (e.g. current job title, education level). The ranked documents are stored as a ranked dataset.

The machine learning engine 210 is configured to generate ranked dataset from the plurality of documents through training. For example, the machine learning engine 210 may train a decision tree to receive a query as an input and generate the ranked dataset by comparing input fields to a field from the plurality of documents, according to some example embodiments. The input fields may be fields from the query or fields from the user's profile information.

The search engine 215 is configured to use weights extracted from the trained decision tree to efficiently generate the top ranking portion of the ranked dataset. In some example embodiments, the weighting information is used to figure a search engine scheme, such as a weighted AND scheme.

The database engine 220 is configured to access data in the database 126 via the database server 124. The database 126 stores data including the document corpus to be searched and user profile information, according to some example embodiments. Further, although the database 126 is shown as a single database, one of ordinary skill in the art appreciates that the database 126 may be implemented as a distributed database to increase access and data retrieval speeds.

Figure 3:
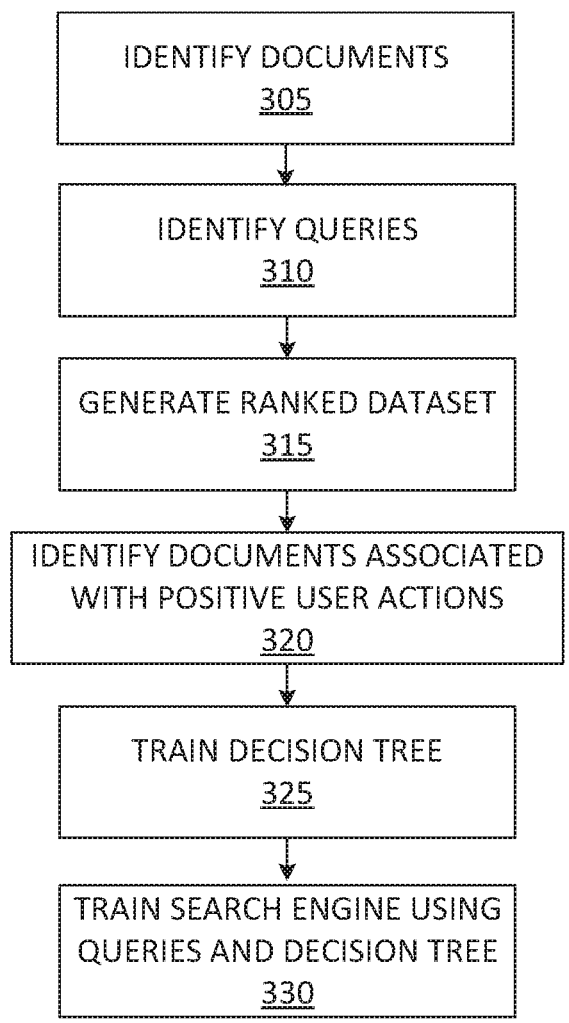
FIG. 3 shows a method for training a candidate ranking search engine to identify a candidate subset, according to some example embodiments.

FIG. 3 shows a method 300 for training a candidate ranking search engine 150 to identify a candidate subset, according to some example embodiments. The method 300 may be implemented by one or more of the components and/or engines illustrated in FIG. 2 and is discussed by way of reference thereto.

At operation 305, the ranking engine 205 identifies a plurality of documents for ranking. At operation 310, the ranking engine 205 identifies example queries for training. In some example embodiments, the example queries are historical queries received from users in the past. In some example embodiments, the example queries are generated specifically for training.

At operation 315, the ranking engine 205 generates a ranked dataset by ranking the plurality of documents based on how well they match a given query. At operation 320, the machine learning engine 210 identifies documents upon which positive user actions were performed. User actions are interactions from users with search results. For example, a user selecting a document from a plurality of returned results is a tracked positive user action. As a further example, a user pressing a button in the document can also be tracked as a positive user action.

At operation 325, the machine learning engine 210 trains a decision tree to identify the high ranked documents and documents that received positive user actions. As discussed in further detail below, in some example embodiments, the decision tree is trained to classify documents as either included or excluded from the top-ranked portion of the ranked documents. Further, the tree may be weighted so that documents which received further positive historical user actions are more likely to be included in the top-ranked portion.

At operation 330, the search engine 215 trains a searching scheme using weighting information extracted from the trained decision tree. The trained searching scheme can then be used to effectively bypass the computationally expensive ranking scheme. For example, when a user query is received, the query is input directly into search engine 215, which then implements the trained search scheme to very quickly identify matching documents (e.g., documents in the top portion of the ranked dataset). The matching documents can then be returned as search results for the query. Further, although in FIG. 3 only reference to a query is discussed, it is appreciated that both query terms and user profile terms can be used to identify the matching documents.

Figure 4:
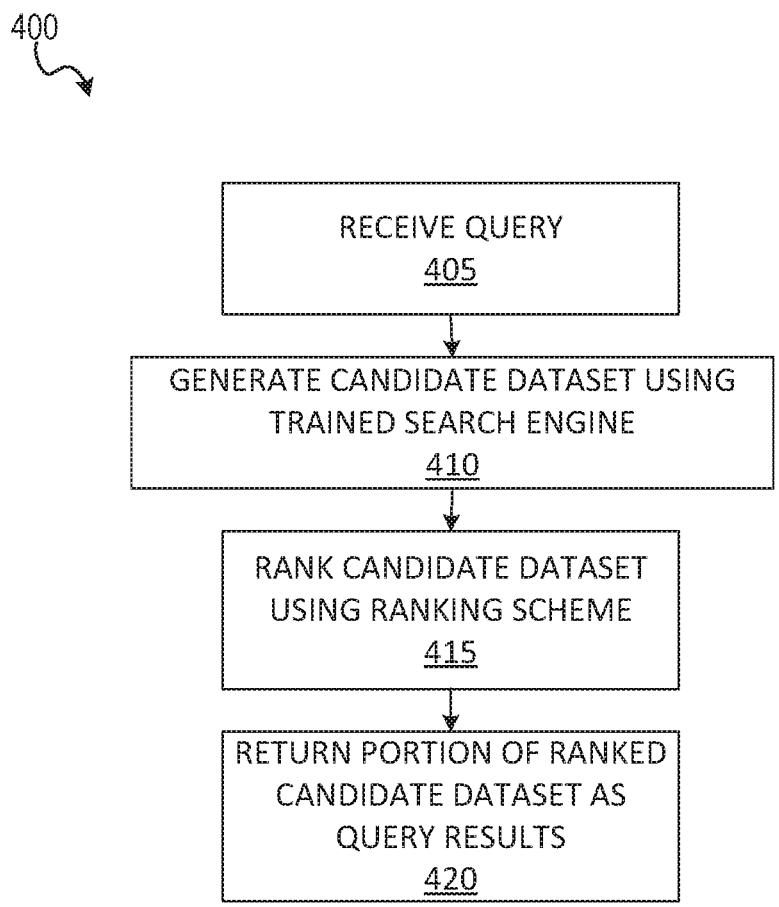
FIG. 4 show a method for generating search results for a query, according to some example embodiments.

FIG. 4 shows a method for generating search results for a query, according to some example embodiments. The method 300 may be implemented by one or more of the components and/or engines illustrated in FIG. 2 and is discussed by way of reference thereto.

At operation 405, the interface engine 200 receives a query from a user. At operation 410, the trained search engine 215 identifies input data including query fields, e.g., a term from the query, and/or user fields, e.g., a term from the user profile. At operation 410, the trained search engine 215 generates, from the plurality for documents, a candidate subset for the query. In some example embodiments, the candidate subset may be directly returned as search results for the query. In some example embodiments, the candidate subset undergoes further processing to refine the results. For example, as illustrated at operation 415, the ranking engine 205 ranks the candidate subset using a ranking scheme. As mentioned above, by using the trained search scheme, the system 150 avoids applying a computationally expensive ranking scheme against the entire set of the plurality of documents, which can be very large (e.g., billions of documents). However, compared to the size of the plurality of documents, the size of the candidate subset can be quite small (e.g., hundreds or thousands of documents). Thus, the ranking scheme, although computationally expensive, can be used in an efficient way by applying the ranking scheme to the much smaller candidate subset instead of the plurality of documents.

Continuing, at operation 420, the interface engine 200 transmits a portion of the ranked candidate subset back to the user as search results for the query.

Figure 5:
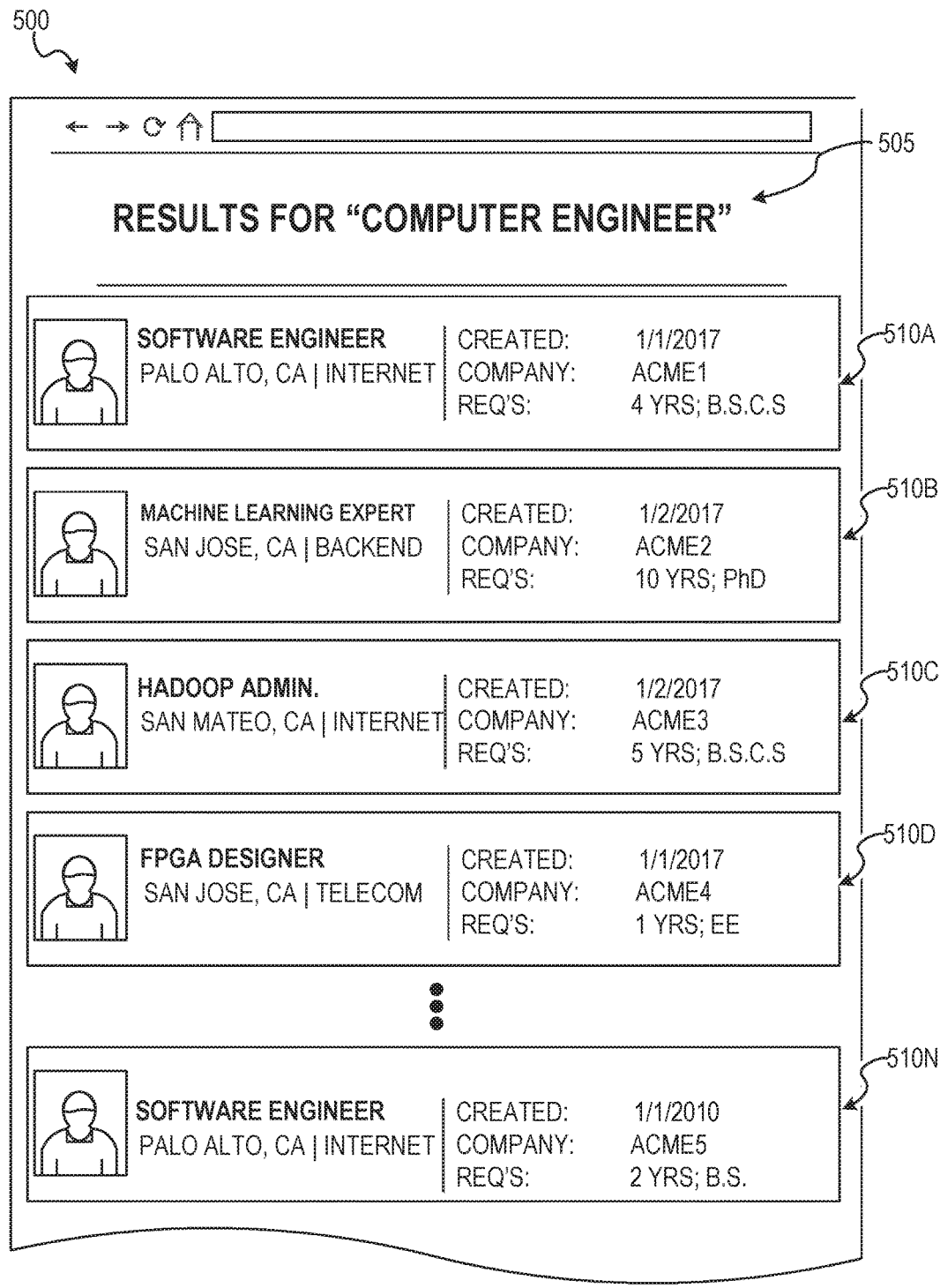
FIG. 5 shows a browser displaying search results for a query, according to some example embodiments.

FIG. 5 shows a browser 500 displaying search results for a query, according to some example embodiments. As illustrated, the user 106 has submitted a query 505 comprising the keywords "computer engineer". Each of the words in the query 505 is an input field for comparison, according to some example embodiments. For example, "computer" is a query field, and "engineer" is a second query field. Further, two or more words may be considered an input field, according to some example embodiments. For example, "computer engineer" can be considered a single input field. Similarly, "operating system" or "Java expert" can both be considered individual input fields though having more than one word.

In response to receiving the query 505, the candidate ranking search engine 150 has returned the search result links 510A-N. In the example, each of the search result links 510A-N corresponds to a document from the plurality of documents. Each of the search result links 510A-N and their respective underlying documents contain document fields. For example, search result link 510A, contains a job title field of "software engineer", a location field of "Palo Alto, Calif." a company field of ACME1", a years of experience field of "4 Yrs" (4 years experience), and an educational requirement field of "B.S.C.S." (Bachelors of Science in Computer Science). To generate search results, according to some example embodiments, the input fields from the query (e.g., "computer engineer") and the input fields from the user profile (e.g., educational level) are compared to the document fields (e.g., "software engineer"), as discussed in further detail below.

Figure 6:
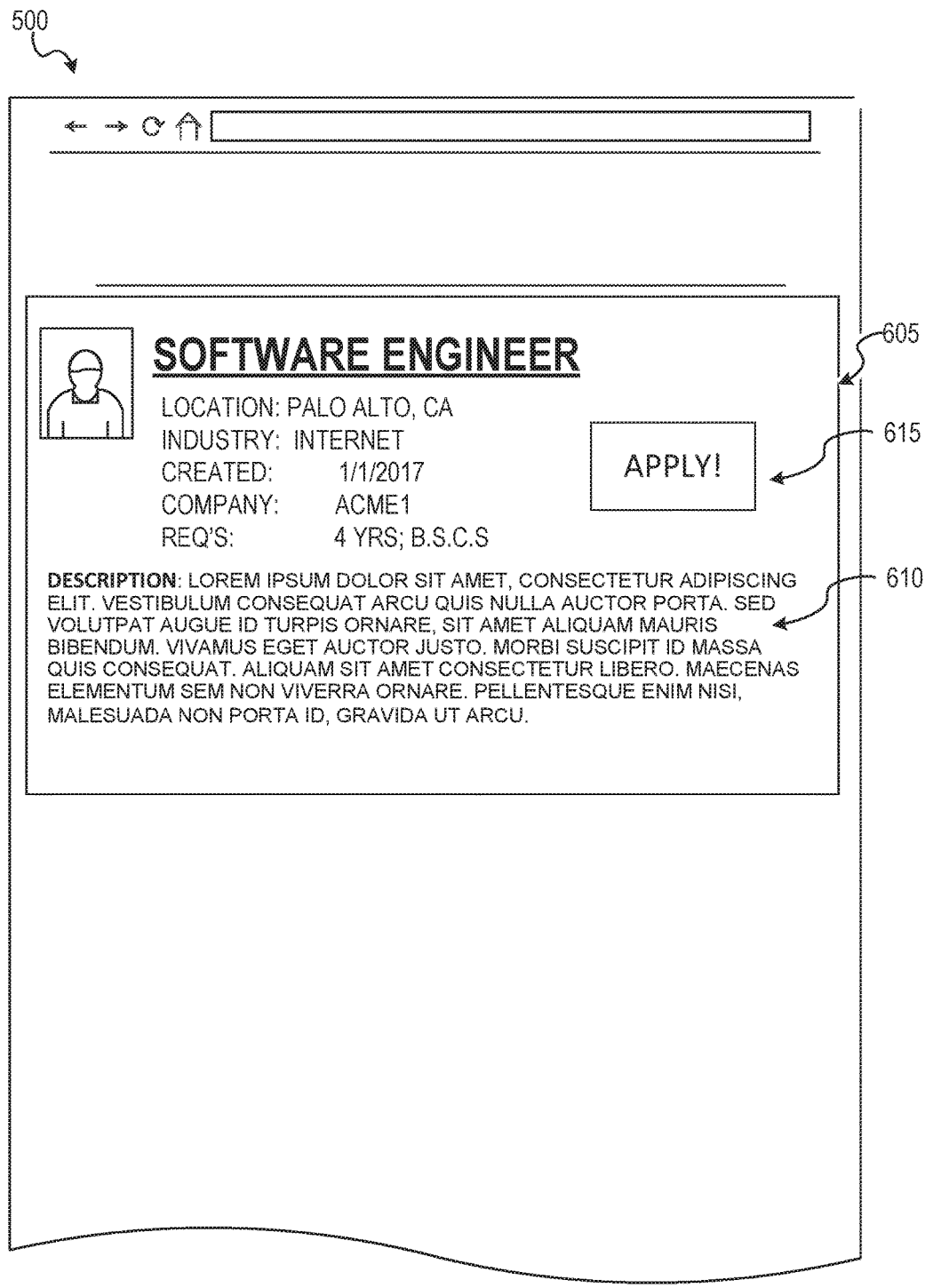
FIG. 6 shows the browser navigating to one of the documents, document 605, in response to a user action.

FIG. 6 shows the browser 500 navigating to one of the documents, document 605, in response to a user action. In particular, for example, document 605 is displayed on the browser 500 in response to the user 106 clicking on search result link 510A, which is hyperlinked to document 605. The action of clicking a search result (e.g., document) for a given query is stored by the database engine 220 as a positive user action for that document. As discussed above, positive user actions are used to train the machine learning scheme, according to some example embodiments.

Document 605 contains further information concerning a job described in search result link 510A. In particular, for example, in addition to the fields shown in the search result link 510A (e.g., "Software Engineer", "Palo Alto, Calif."), document 605 contains a description field 610 for keywords describing the job, and an apply button 615. If the user 106 is interested in applying for the job, he/she selects the apply button 615 which links the user 106 to a registration form (e.g., one or more web pages with registration fields) served from the application server 140 or a third-party website (e.g., a site hosted by third-party server 130). The action of selecting the apply button 615 is stored by the database engine 220 as a positive user action for that document. Further, the action of viewing the document 605 (e.g., an impression) is also stored as a positive user interaction for the document 605, according to some example embodiments.

Figure 7:
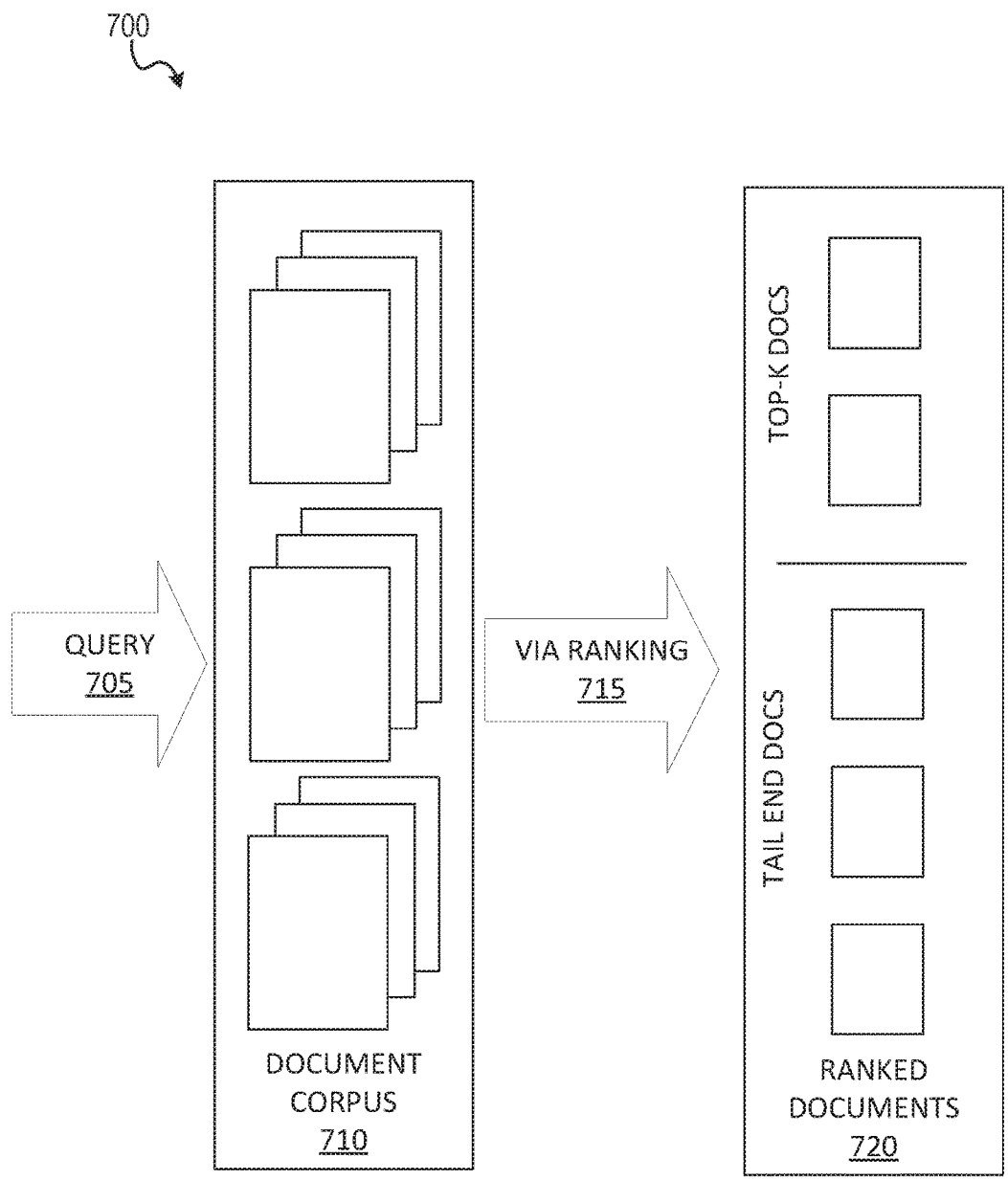
FIG. 7 shows a functional architecture for ranking documents, according to some example embodiments.

FIG. 7 shows a functional architecture 700 for ranking documents, according to some example embodiments. At operation 705, a training query is received. The query is intended to be processed against a document corpus 710, which is a plurality of webpages according to some example embodiments. For example, the query may include the term "computer engineer", and the user may be seeking to see results that best match the term.

At operation 715, a ranking engine 205 generates a ranked document dataset 720 by ranking the documents according to how well each matches the query. The ranked document dataset 720 is divided into two portions, a top-k portion and tail-end documents portion. The top-k portion is the top-k ranked documents, where k is an integer. For example, if 3500 documents are ranked and k is 1000, the top portion is the top ranked 1000 documents and the tail-end documents is the remaining 2500 documents.

Figure 8:
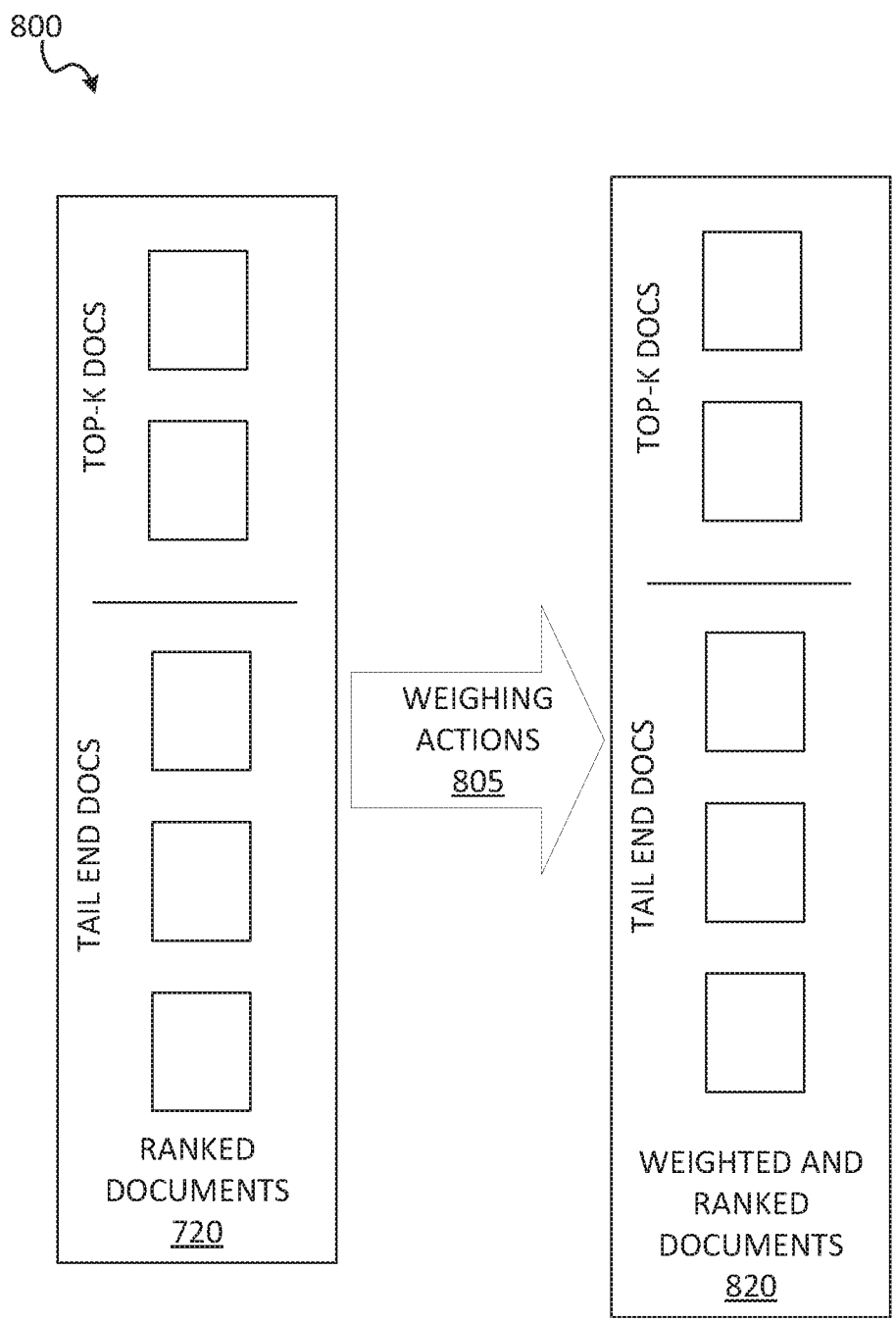
FIG. 8 shows a functional architecture for weighting documents, according to some example embodiments.

FIG. 8 shows a functional architecture 800 for weighting documents, according to some example embodiments. As illustrated, each of the documents in the ranked document dataset 720 is analyzed to determine whether the document has received positive historical user actions, such as document impressions, document selections (e.g., selecting the document from a plurality of results), and other interactions with the document (e.g., clicking a button in the document, registering for a job mentioned in the document via a third-party website). At operation 805, the documents that correspond to positive historical user actions are weighted more heavily than the documents that do not have positive user action actions associated with them, thereby generating weighted and ranked documents dataset 820. Some of the documents weighted more heavily due to past historical user actions can be in the top-k portion and some of the documents can be in the tail-end documents portion.

Figure 9:
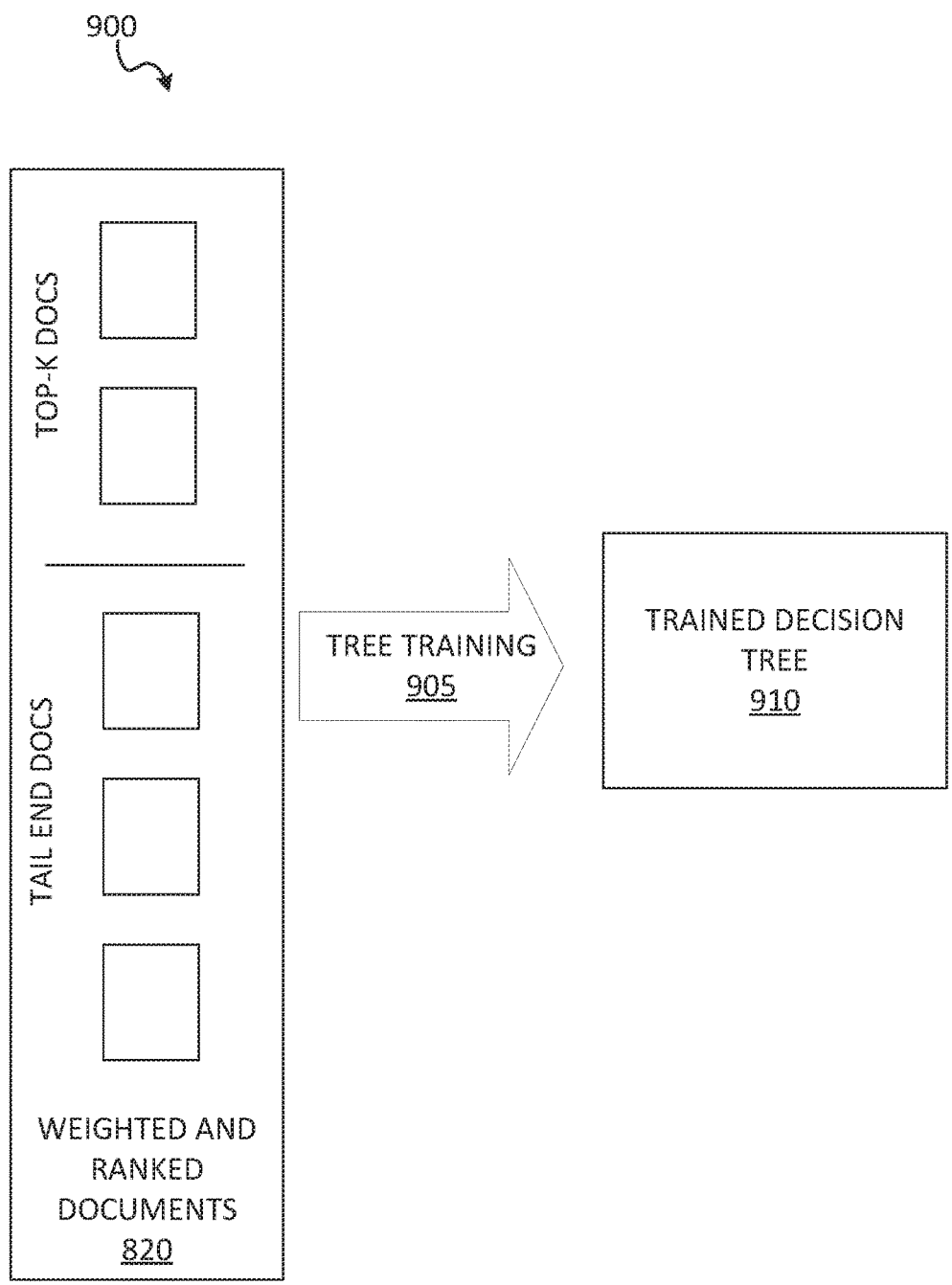
FIG. 9 shows a functional architecture for training a machine learning scheme, according to some example embodiments.

FIG. 9 shows a functional architecture 900 for training a machine learning scheme, according to some example embodiments. As illustrated, the weighted and ranked documents dataset 820 is used as training data for a machine learning scheme, such as a decision tree or boosted decision tree (e.g., a decision tree configured to use weightings). In particular, for instance, at operation 905 a decision tree is trained to receive a given query and generate a ranked dataset, such as the weighted and ranked documents dataset 820. For a given document, the decision tree is trained to either assign the document as included in the candidate subset or not included in the candidate subset. According to some embodiments, the documents in the top-k portion are more heavily weighted in the decision tree (e.g., boosted decision tree) so that they are included in the candidate subset. Similarly, the documents that correspond to historical positive user actions are also more heavily weighted in the decision tree (e.g., boosted decision tree) so that those documents are included in the candidate subset. The trained decision tree 910 is the result of operation 905.

Figure 10:
FIG. 10 shows a functional architecture for training the search engine, according to some example embodiments.

FIG. 10 shows a functional architecture 1000 for training the search engine 215, according to some example embodiments. As illustrated, at operation 1005, the trained decision tree 910 is used to train a search engine scheme to generate a trained search engine 1010. In some example embodiments, the search engine scheme is a weighted AND query search scheme in which a comparison of an input field and a result field is assigned a weighted value. If the sum of all the weighted values exceeds a pre-configured threshold, the document is included in the candidate subset. Further details regarding the decision tree and the search scheme are discussed below, with reference to FIG. 13.

Figure 11:
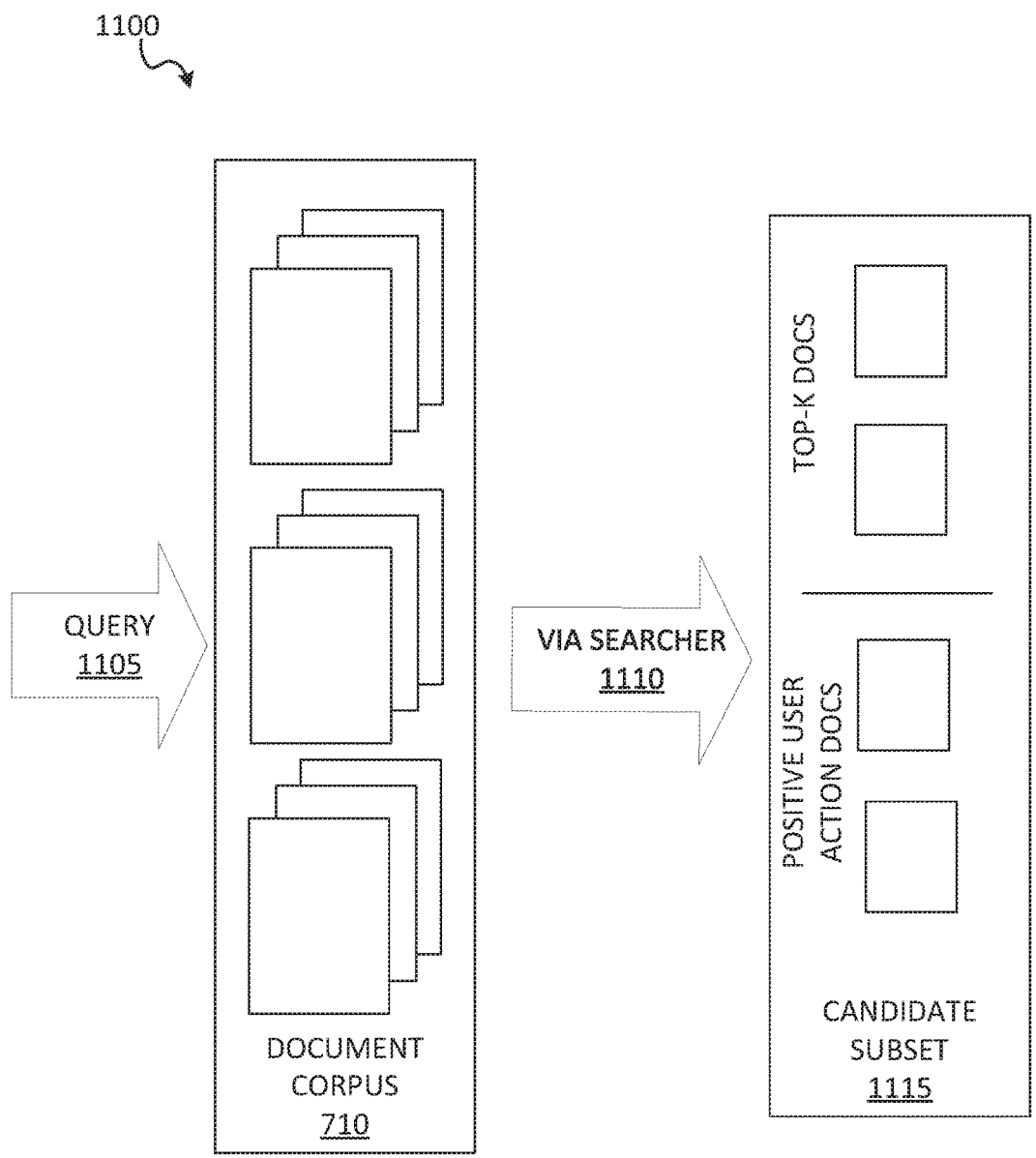
FIG. 11 shows a functional architecture for generating a candidate subset from a user query, according to some example embodiments.

FIG. 11 shows a functional architecture 1100 for generating a candidate subset from a user query, according to some example embodiments. At operation 1105, a query from a user (e.g., "computer engineer Palo alto" is received from the user 106 via the client device 110. The query is to be processed against a document corpus 710, which is a plurality of webpages according to some example embodiments. At operation 1110, in response to receiving the query, the trained search scheme generates the candidate subset 1115, which can include the highest ranking documents (e.g., documents previously ranked high for the keywords in the query), and which can further include documents upon which historical positive user actions were performed (e.g., an impression, click actions). In some example embodiments the candidate subset 1115 is returned as search results for the query. In some examples, the candidate subset 1115 undergoes further processing for search result selection, as discussed in FIG. 12.

Figure 12:
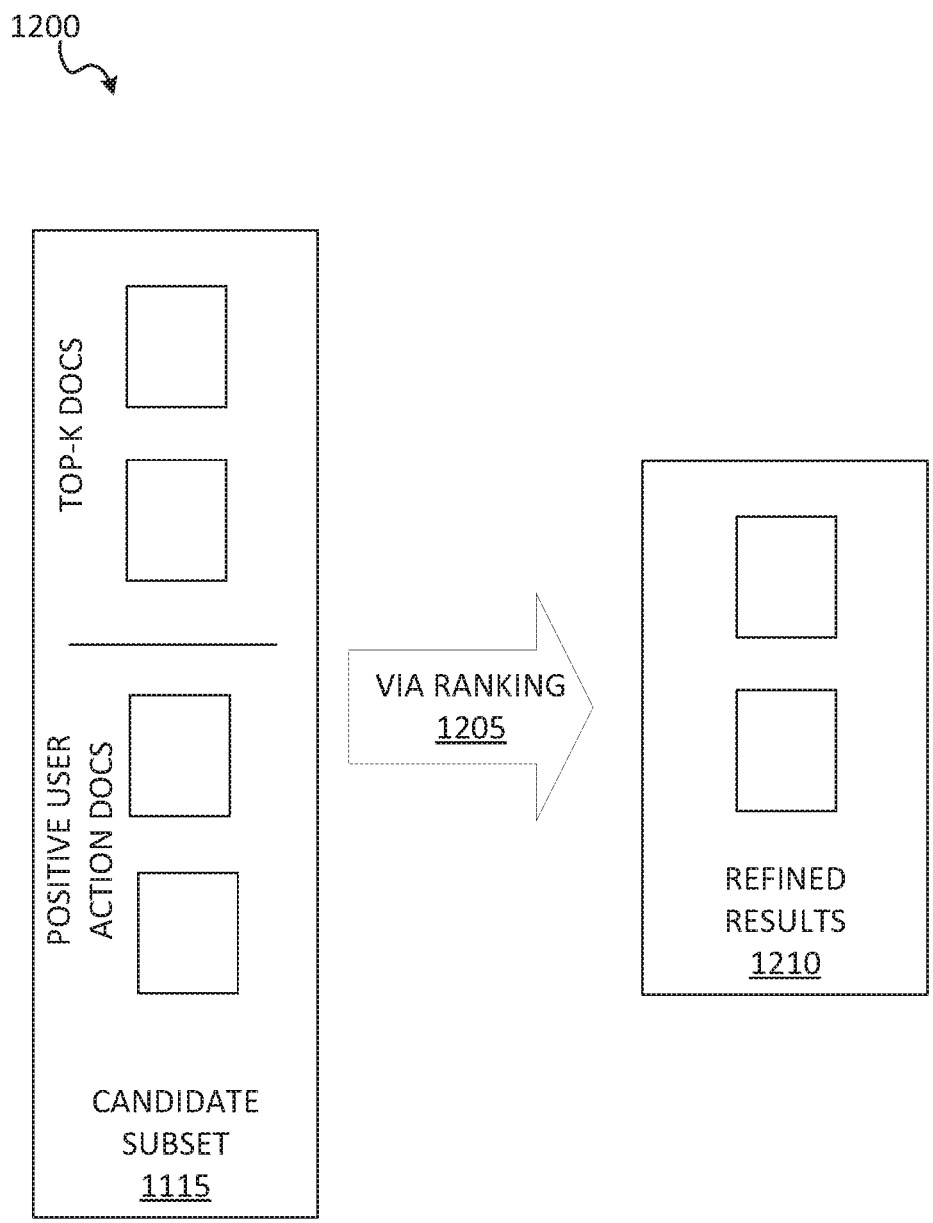
FIG. 12 shows a functional architecture for generating query results, according to some example embodiments.

FIG. 12 shows a functional architecture 1200 for generating query results, according to some example embodiments. As illustrated, at operation 1205, the candidate subset 1115 undergoes ranking via a candidate ranking scheme to generate the refined results 1210. In some example embodiments, the candidate ranking scheme is the same ranking scheme initially applied to generate the ranked dataset 720. In some example embodiments, the candidate ranking scheme is a different ranking scheme than the ranking scheme used to generate the ranked dataset 720.

Figure 13:
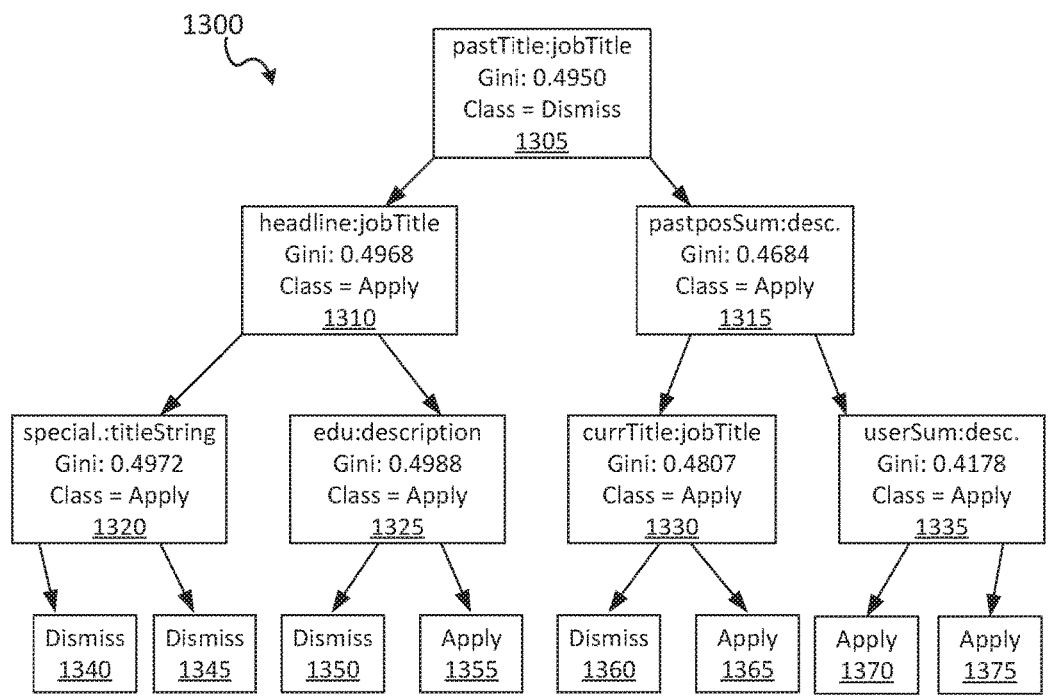
FIG. 13 shows an example machine learning scheme, according to some example embodiments.

FIG. 13 shows an example machine learning scheme, according to some example embodiments. As illustrated, the machine learning scheme is a decision tree 1300. Each of the nodes 1305-1335 corresponds to a test of the tree 1300 in which an input field is compared to a result field of a potential search result (e.g., a document from the plurality of documents). For example, in node 1305, the input field is "pastTitle", which is a past job title from a user's user profile, and the result field is "jobTitle", which is the job title of a document listing an open job. As a further example, in node 1315, the input field is "strTitle", which is a title of a field from the query (e.g., query 505, which recites "computer engineer"), and the result field is "desc.", which is a description of a job listed in the document.

In each node, an input field is compared to a result field and the documents are divided to maximize an increase in decision tree information, as is understood by those of ordinary skill in the art. In particular, for example, the node may divide the documents using a Gini impurity scheme, according to some example embodiments. Each node in the decision tree 1300 lists its corresponding Gini value.

Nodes 1340-1375 are result action nodes. Documents are divided at each node until the documents are all categorized into a result action node. If a document is categorized into a "dismiss" result action node 1360, the document is not included in the candidate subset. In contrast, if a document is categorized into an "apply" result action node 1365, the document is included in the candidate subset. Each of the nodes 1305-1335 also have result actions (e.g., "apply", "dismiss") listed in them, e.g., as tracked metadata for a given node.

As disclosed above, the search engine scheme can be tuned using weighting from the decision tree 1300. In some example embodiments, a weighted AND query scheme is implemented. As an example of a weighted AND query scheme, assume the following input fields: (1) "user title", (2) "user skills", (3) "position summary", (4) "industry", and (5) "seniority level". The example input fields are user-entered fields from a given user's user profile. Further assume the following document fields: (1) "job title", (2) "job skills", (3) "job summary", (4) "job industry", and (5) "job seniority".

In a weighted AND query, an input field and a document field are compared, and if they match, a value is granted. Multiple comparisons can be performed in a given clause. If the combined values for a clause exceeds a pre-configured threshold, the document is included in the candidate subset. Assume here the weighted AND threshold is 0.5.

To further explain, assume the following clauses:

1. ((user title, job title): (user skills, job skills), 0.55)

2. ((user title, job title): (user position summary, job skills), 0.35)

3. ((user industry, job industry): (user position summary, job skills), 0.25)

4. ((user industry, job industry): (user seniority, b seniority), 0.05)

Each example clause above has two comparisons, and each comparison compares an input field against a document field. If a clause is satisfied, the document is assigned the indicated value. Multiple clauses can be satisfied. If the value of one or more clauses exceeds the pre-configured threshold, the document is included in a candidate subset.

For example, if the user query matches the job query from the document and at least one job skill matches the job skill, then the first clause is satisfied and the document is assigned the value of 0.55. Since 0.55 exceeds the required threshold of 0.5, the document is then included in the candidate subset. Similarly, if a query and document satisfy the second and third clauses, the total value is 0.6 and the document is included in the candidate subset. However, if only the third and fourth clauses are satisfied, then the document is not included in the candidate subset, since the sum of 0.25 and 0.05 do not exceed 0.5.

According to some example embodiments, the search engine scheme is trained by more heavily weighting the chain of comparisons (e.g., chain of nodes, where each node comprises a comparison) that lead to a final "apply" node in the decision tree. Each comparison in a given node corresponds to a comparison in the above example using clauses. Thus, the stun of values assigned to comparison of node 1305, node 1315, node 1335, and node 1375 are weighted such that the pre-configured total threshold of 0.5 is surpassed. In contrast, the search engine scheme is further trained by less heavily weighting the chain of comparisons that result to a final dismiss node. Thus, the sum of values assigned to comparisons of nodes 1305, 1315, 1330, and 1360 are weighted such that the pre-configured threshold of 0.5 is not met, and therefore the document is excluded from the candidate subset. In some example embodiments, the weighting information is the Gini value for the node. Further, as discussed above, documents that have historical positive user interactions are pre-boosted with a value, such that they are more likely to exceed the threshold of 0.5 even if the result action node is a dismiss node, according to some example embodiments.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-13 are implemented in some embodiments in the context of a machine and an associated software architecture. The sections below describe representative software architecture and machine (e.g., hardware) architecture that are suitable for use with the disclosed embodiments.

Figure 14:
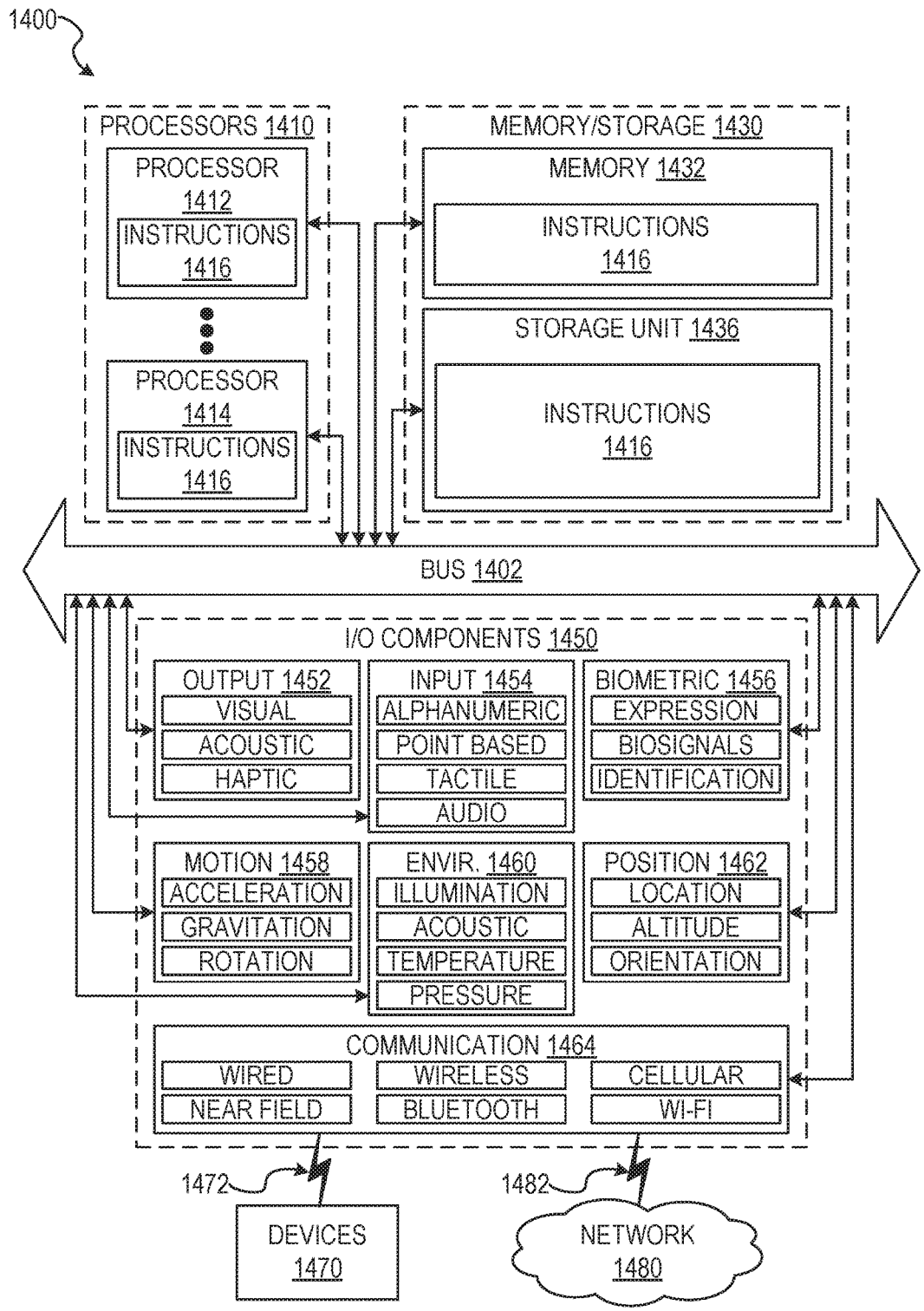
FIG. 14 illustrates a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system within which instructions 1416 (e.g., software, a program, an application, an applet, an app, or other executable code) for causing the machine 1400 to perform any one or more of the methodologies discussed herein can be executed. For example, the instructions 1416 can cause the machine 1400 to execute the flow diagrams of FIGS. 3 and 4. Additionally, or alternatively, the instruction 1416 can implement the interface engine 200, ranking engine 205, machine learning engine 210, search engine 215, and database engine 220 of FIG. 2, and so forth. The instructions 1416 transform the general, non-programmed machine into a particular machine programmed to carry out the described and illustrated functions in the manner described. In alternative embodiments, the machine 1400 operates as a standalone device or can be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 can include processors 1410, memory/storage 1430, and I/O components 1450, which can be configured to communicate with each other such as via a bus 1402. In an example embodiment, the processors 1410 (e.g., a Central Processing Unit (CPU), a Reduced instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1412 and processor 1414 that may execute instructions 1416. The term "processor" is intended to include multi-core processor that may comprise two or more independent processors (sometimes referred to as "cores") that can execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory/storage 1430 can include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 can also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit, 1436, and the memory of the processors 1410 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 can include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 can include output components 1452 and input components 1454. The output components 1452 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1450 can include biometric components 1456, motion components 1458, environmental components 1460, or position components 1462 among a wide array of other components. For example, the biometric components 1456 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 can include acceleration sensor components (e.g., an accelerometer), gravitation sensor components, rotation sensor components (e.g., a gyroscope), and so forth. The environmental components 1460 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that, may provide indications, measurements, or signals corresponding to a surrounding physical environment. The position components 1462 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or other suitable device to interface with the network 1480. In further examples, communication components 1464 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 can detect identifiers or include components operable to detect identifiers. For example, the communication components 1464 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced. Space Symbology (UCC RSS)-2D bar codes, and other optical codes), acoustic detection components (e.g., microphones to identify tagged audio signals), or any suitable combination thereof. In addition, a variety of information can be derived via the communication components 1464, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FIR network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or other type of cellular or wireless coupling. In this example, the coupling 1482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1416 can be transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, the instructions 1416 can be transmitted or received using a transmission medium via the coupling 1472 (e.g., a peer-to-peer coupling) to devices 1470. The term "transmission medium" shall be taken to include any intangible medium that is capable of storing, encoding, or carrying the instructions 1416 for execution by the machine 1400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments that are disclosed herein. Such embodiments of the inventive subject matter may be referred to herein, individually or collectively, by the term "invention" merely for convenience and without intending to voluntarily limit the scope of this application to any single embodiment or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments that are disclosed herein. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments that are disclosed herein as represented by the appended claims. The specification and drawings are, accordingly, to be regarded in an illustrative rather than a restrictive sense.

What is claimed is:

1. A method comprising:
    generating, using one or more hardware processors, a ranked dataset by ranking a plurality of documents using a ranking scheme;
    identifying which of the ranked plurality of documents have associated tracked positive user actions within a graphical user interface;
    dividing the ranked plurality of documents into a top-ranked portion and a bottom-ranked position;
    using a machine learning engine to train a decision tree to classify documents as either included or excluded from the top-ranked portion of the ranked documents, the decision tree weighted so that documents which receive further tracked positive user actions are more likely to be included in the top-ranked portion;
    extracting weighting information from the trained decision tree;
    training a search engine to weight one or more input data fields with weights from the trained machine learning scheme, the one or more input data fields include one or more query fields;
    receiving a query for processing against the plurality of documents;
    generating, using the trained search engine, a candidate subset of the plurality of documents as results for the query in lieu of using the ranking scheme for results of the query; and
    providing one or more documents from the candidate subset to the client device.

2. The method of claim 1, wherein the one or more input data fields include one or more fields from user data.

3. The method of claim 1, wherein the machine learning scheme is a decision tree and at least some branches of the decision tree compare a field from the query to a field from the plurality of documents.

4. The method of claim 3, wherein training the decision tree comprises:
    more heavily weighting documents in the plurality of documents that correspond to positive historical user actions.

5. The method of claim 4, wherein the positive historical user actions include one or more of: an impression of a document from the plurality of documents or interaction with a link of a document from the plurality of documents.

6. The method of claim 3, wherein the field from the plurality of documents is a field from an index generated from the plurality of documents.

7. The method of claim 1, wherein the search engine weights queries using a weighted AND scheme.

8. The method of claim 7, wherein documents in the candidate subset exceed a threshold of the weighted AND scheme.

9. The method of claim 1, wherein providing the one or more documents from the candidate subset comprises:
    generating a ranked candidate subset by ranking, using one or more hardware processors, the candidate subset using a candidate ranking scheme; and
    assigning top ranking documents in the ranked candidate subset as the one or more documents to be provided as the results for the query.

10. The method of claim 1, wherein the ranking scheme ranks the plurality of documents based at least in part on a likelihood of the documents matching a historical query.

11. A system comprising:
    one or more hardware processors of a machine; and
    a memory storing instructions that, when executed by the one or more hardware processors, cause the machine to perform operations comprising:
        generating, using one or more hardware processors, a ranked dataset by ranking a plurality of documents using a ranking scheme;
        identifying which of the ranked plurality of documents have associated tracked positive user actions within a graphical user interface;
        dividing the ranked plurality of documents into a top-ranked portion and a bottom-ranked position;
        using a machine learning engine to train a decision tree to classify documents as either included or excluded from the top-ranked portion of the ranked documents, the decision tree weighted so that documents which receive further tracked positive user actions are more likely to be included in the top-ranked portion;
        extracting weighting information from the trained decision tree;
        training a search engine to weight one or more input data fields with weights from the trained machine learning scheme, the one or more input data fields include one or more query fields;

receiving a query for processing against the plurality of documents;

generating, using the trained search engine, a candidate subset of the plurality of documents as results for the query in lieu of using the ranking scheme for results of the query; and providing one or more documents from the candidate subset to the client device.

12. The system of claim 11, wherein the one or more input data fields include one or more fields from user data.

13. The system of claim 12, wherein the machine learning scheme is a decision tree and at least some branches of the decision tree compare a field from the query to a field from the plurality of documents.

14. The system of claim 13, wherein the instructions cause the machine to train the decision tree using operations comprising:

more heavily weighting documents in the plurality of documents that correspond to positive historical user actions, and wherein the positive historical user actions include one or more of: an impression of a document from the plurality of documents or interaction with a link of a document from the plurality of documents.

15. The system of claim 13, wherein the field from the plurality of documents is a field from an index generated from the plurality of documents.

16. The system of claim 11, wherein the search engine weights queries using a weighted AND scheme, and wherein documents in the candidate subset exceed a threshold of the weighted AND scheme.

17. The system of claim 11, wherein the operations for providing the one or more documents from the candidate subset further comprise:

generating a ranked candidate subset by ranking, using the one or more hardware processors, the candidate subset using a candidate ranking scheme; and assigning top ranking documents in the ranked candidate subset as the one or more documents to be provided as the results for the query; and wherein the ranking scheme ranks the plurality of documents based at least in part on a likelihood of the documents matching a training query.

18. A machine-readable storage medium embodying instructions that, when executed by a machine, cause the machine to perform operations comprising:

generating, using one or more hardware processors, a ranked dataset by ranking a plurality of documents using a ranking scheme;

identifying which of the ranked plurality of documents have associated tracked positive user actions within a graphical user interface;

dividing the ranked plurality of documents into a top-ranked portion and a bottom-ranked position;

using a machine learning engine to train a decision tree to classify documents as either included or excluded from the top-ranked portion of the ranked documents, the decision tree weighted so that documents which receive further tracked positive user actions are more likely to be included in the top-ranked portion;

extracting weighting information from the trained decision tree;

training a search engine to weight one or more input data fields with weights from the trained machine learning scheme, the one or more input data fields include one or more query fields;

receiving a query for processing against the plurality of documents;

generating, using the trained search engine, a candidate subset of the plurality of documents as results for the query in lieu of using the ranking scheme for results of the query; and providing one or more documents from the candidate subset to the client device.

19. The machine-readable storage medium of claim 18, wherein the one or more input data fields include one or more fields from user data, and wherein the machine learning scheme is a decision tree, and wherein at least some branches of the decision tree compare a field from the query to a field from the plurality of documents, and wherein the instructions cause the machine to train the decision tree using operations comprising:

more heavily weighting documents in the plurality of documents that correspond to positive historical user actions; and wherein the positive historical user actions include one or more of: an impression of a document from the plurality of documents or interaction with a link of a document from the plurality of documents.

20. The machine-readable storage medium of claim 18, wherein the search engine weights queries using a weighted AND scheme, and wherein documents in the candidate subset exceed a threshold of the weighted AND scheme; and wherein the instructions further cause the machine to provide the one or more documents from the candidate subset using operations comprising:

generating a ranked candidate subset by ranking, using the one or more hardware processors, the candidate subset using a candidate ranking scheme; and assigning top ranking documents in the ranked candidate subset as the one or more documents to be provided as the results for the query; and wherein the ranking scheme ranks the plurality of documents based at least in part on a likelihood of the documents matching a training query.

* * * * *